US012342266B2

(12) United States Patent
Lee et al.

(10) Patent No.: US 12,342,266 B2
(45) Date of Patent: Jun. 24, 2025

(54) METHOD FOR PERFORMING WIRELESS COMMUNICATION AND ELECTRONIC DEVICE SUPPORTING THE SAME

(71) Applicant: SAMSUNG ELECTRONICS CO., LTD., Suwon-si (KR)

(72) Inventors: Seungbum Lee, Suwon-si (KR); Hyemin Kim, Suwon-si (KR); Hwanyeol Kim, Suwon-si (KR); Seungin Jung, Suwon-si (KR); Seoyeon Hong, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 453 days.

(21) Appl. No.: 17/946,040

(22) Filed: Sep. 16, 2022

(65) Prior Publication Data
US 2023/0113030 A1 Apr. 13, 2023

Related U.S. Application Data

(63) Continuation of application No. PCT/KR2022/013254, filed on Sep. 5, 2022.

(30) Foreign Application Priority Data

Oct. 12, 2021 (KR) .......................... 10-2021-0134764

(51) Int. Cl.
*H04W 48/16* (2009.01)
*H04W 8/00* (2009.01)

(52) U.S. Cl.
CPC .......... *H04W 48/16* (2013.01); *H04W 8/005* (2013.01)

(58) Field of Classification Search
CPC ..... H04W 48/16; H04W 8/005; H04W 88/06; H04W 84/12; H04W 48/20; H04W 88/02;
(Continued)

(56) References Cited

U.S. PATENT DOCUMENTS 6,606,668 B1 * 8/2003 MeLampy ............. H04Q 3/005
709/241
9,066,370 B2 * 6/2015 Srinivasan ............ H04W 36/22
(Continued)

FOREIGN PATENT DOCUMENTS

CN 106899971 B * 3/2022 ........... H04B 7/0417
EP 3589068 A1 * 1/2020 ............... H04B 7/02
(Continued)

OTHER PUBLICATIONS

International Search Report mailed Jan. 4, 2023 for PCT/KR2022/013254, citing the above reference(s).
(Continued)

*Primary Examiner* — Wutchung Chu
(74) *Attorney, Agent, or Firm* — CANTOR COLBURN LLP

(57) ABSTRACT

An electronic device includes a communication circuit, a processor, and a memory which stores instructions. The instructions, when executed by the processor, causes the electronic device to identify a first number, which is a number of available wireless connections of the electronic device, to receive a second number, which is a number of available wireless connections of a first external electronic device of a plurality of external electronic devices by using the communication circuit, to identify a third number, which is a number of wireless connections to be used for data transmission and reception with the first external electronic device, based on the first number and the second number, to establish the third number of wireless connections with the first external electronic device, and to transmit/receive data with the first external electronic device by using the third number of the wireless connections.

18 Claims, 11 Drawing Sheets

(58) Field of Classification Search
CPC ..... H04W 76/14; H04W 76/15; H04W 76/36; H04M 1/72412
See application file for complete search history.

(56) References Cited

U.S. PATENT DOCUMENTS

| | | | |
|---|---|---|---|
| 9,325,805 | B2 | 4/2016 | Shattil |
| 9,774,505 | B2 | 9/2017 | Shattil |
| 10,021,175 | B2 | 7/2018 | Shattil |
| 10,033,870 | B1 * | 7/2018 | Koster ............... H04M 3/42059 |
| 10,084,688 | B2 | 9/2018 | Christmas et al. |
| 10,390,380 | B2 | 8/2019 | Jung et al. |
| 10,812,375 | B2 | 10/2020 | Christmas et al. |
| 10,993,212 | B2 | 4/2021 | Yang et al. |
| 11,540,261 | B2 | 12/2022 | Yang et al. |
| 11,601,791 | B2 | 3/2023 | Lim et al. |
| 2010/0074132 | A1 * | 3/2010 | Shen ................... H04L 67/1023 370/252 |
| 2010/0178919 | A1 | 7/2010 | Deepak et al. |
| 2011/0283001 | A1 * | 11/2011 | Jung ..................... H04W 28/16 709/227 |
| 2012/0290876 | A1 * | 11/2012 | Nortz ..................... H04L 65/80 709/219 |
| 2013/0156000 | A1 * | 6/2013 | Hwang ............. H04W 72/0453 370/336 |
| 2016/0309482 | A1 | 10/2016 | Verma et al. |
| 2016/0380688 | A1 * | 12/2016 | Yan ......................... H04L 69/22 370/215 |
| 2017/0290068 | A1 * | 10/2017 | VanBlon ............... H04W 72/52 |
| 2017/0374569 | A1 * | 12/2017 | Lee ........................... H04L 5/00 |
| 2020/0382945 | A1 | 12/2020 | Yang |

FOREIGN PATENT DOCUMENTS

| | | |
|---|---|---|
| JP | 2009-206910 A | 9/2009 |
| KR | 10-2011-0110312 A | 10/2011 |
| KR | 20150038802 A | 4/2015 |
| KR | 10-2016-0118285 A | 10/2016 |
| KR | 20170139011 A | 12/2017 |
| KR | 10-2018-0048070 A | 5/2018 |
| KR | 20190122392 A | 10/2019 |
| KR | 10-2020-0058453 A | 5/2020 |

OTHER PUBLICATIONS

The extended European search report for EP Application No. 22881210.3 mailed on Oct. 9, 2024, citing the above reference(s).

* cited by examiner

METHOD FOR PERFORMING WIRELESS COMMUNICATION AND ELECTRONIC DEVICE SUPPORTING THE SAME

CROSS-REFERENCE TO RELATED APPLICATIONS

This application is a continuation of International Application No. PCT/KR2022/013254 designating the United States, filed on Sep. 5, 2022, in the Korean Intellectual Property Receiving Office and claiming priority to Korean Patent Application No. 10-2021-0134764, filed on Oct. 12, 2021, in the Korean Intellectual Property Office, the disclosures of which are incorporated by reference herein in their entireties.

BACKGROUND

Field

Embodiments of the disclosure relate to a method for performing wireless communication and an electronic device supporting the method.

Description of Related Art

With the development of information communication technologies, a portable electronic device (e.g., a smartphone) is being rapidly supplied and used. For example, a smartphone may provide various functions such as a picture photographing function, a data communication function, an Internet access function, and a short range wireless communication function, in addition to a general communication function such as a voice call or a message exchange.

An electronic device may use various types of wireless communication schemes for the purpose of performing short range communication. For example, the electronic device may perform the wireless communication function based on a Bluetooth™, infrared communication, Zigbee, or wireless LAN scheme. Meanwhile, to overcome the limitation that the wireless communication scheme based on the wireless LAN uses a wireless LAN access device (e.g., an access point), a Wi-Fi Direct and a Wi-Fi Aware have been developed based on the Wi-Fi technology. For example, based on the Wi-Fi Direct scheme, an electronic device may perform wireless communication with an external electronic device without passing through the wireless LAN access device. As another example, based on the Wi-Fi aware scheme in which a neighbor awareness technology operates in a background mode, the electronic device may easily search external electronic devices adjacent to the electronic device, an application, and/or various information, and may perform wireless communication based on a found result.

An electronic device may transmit/receive various data to/from an external electronic device. For example, in the case where the electronic device transmits a plurality of data packets to an external electronic device, a delay time may occur in the process of sequentially sending data. Also, the overhead coming from the process of processing data for transmission causes the electronic device to perform a data transmission function at a relatively low speed.

The electronic device may perform wireless communication with a first external electronic device performing wireless communication with a second external electronic device among the plurality of external electronic devices in a state where the plurality of external electronic devices occupy a wireless resource. This makes it difficult for the electronic device to determine whether the first external electronic device performs wireless communication with any devices. Accordingly, it may be difficult for the electronic device to identify the performance and/or the number of available wireless connections of the first external electronic device. This may make it difficult for the electronic device to perform wireless communication in an optimum situation.

SUMMARY

According to an embodiment of the disclosure, an electronic device includes a communication circuit, a processor, and a memory which stores instructions. In such an embodiment, the instructions, when executed by the processor, causes the electronic device to identify a first number, which is a number of available wireless connections of the electronic device, to receive a second number, which is a number of available wireless connections of a first external electronic device of a plurality of external electronic devices, by using the communication circuit, to identify a third number, which is a number of wireless connections to be used for data transmission and reception with the first external electronic device, based on the first number and the second number, to establish the third number of wireless connections with the first external electronic device, and to transmit/receive data with the first external electronic device by using the third number of the wireless connections.

According to an embodiment of the disclosure, a wireless communication performing method of an electronic device includes identifying a first number, which is a number of available wireless connections of the electronic device, receiving a second number, which is a number of available wireless connections of a first external electronic device of a plurality of external electronic devices, by using a communication circuit, identifying a third number, which is a number of wireless connections to be used for data transmission and reception with the first external electronic device, based on the first number and the second number, establishing the third number of wireless connections with the first external electronic device, and transmitting/receiving data with the first external electronic device by using the third number of the wireless connections.

According to an embodiment of the disclosure, when an electronic device transmits/receives data with an external electronic device, the electronic device may effectively determine the number of wireless connections for performing wireless communication, and thus, the performance of a wireless communication function may be improved.

According to an embodiment of the disclosure, the electronic device may determine the number of wireless connections in consideration of a wireless resource-occupied state, a wireless communication use state of an external electronic device, and/or an operating state of the electronic device and thus may provide the wireless communication function with the improved performance in various environments.

The effects that are achieved through various embodiments of the disclosure may not be limited to what has been described herein, and other effects not described herein may be clearly understood from the following detailed description by persons skilled in the art.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In the description of the drawings, the same or similar reference numerals may be used for the same or similar components.

DETAILED DESCRIPTION

Hereinafter, various example embodiments of the disclosure will be described in greater detail with reference to the accompanying drawings. However, it should be understood that the disclosure is not limited to specific embodiments, but rather includes various modifications, equivalents and/or alternatives of the embodiments of the present disclosure.

Figure 1:
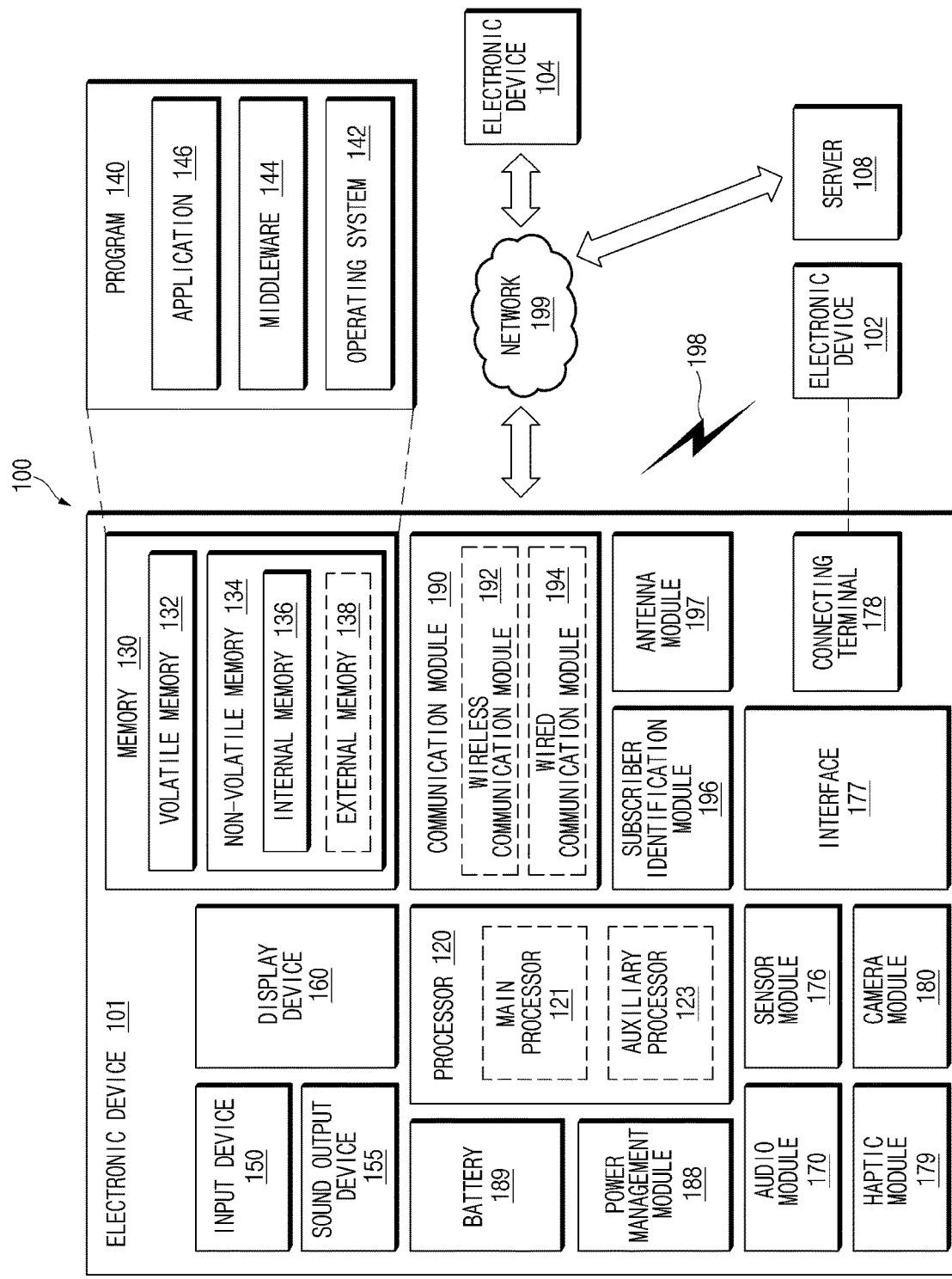
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
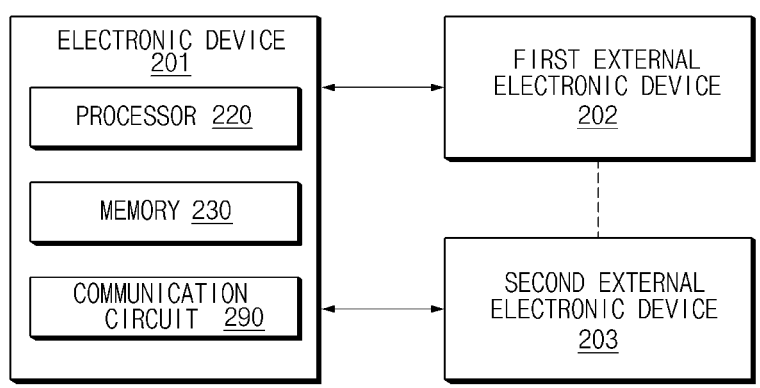
FIG. 2 is a block diagram illustrating an electronic device and external electronic devices, according to an embodiment.

FIG. 2 is a block diagram illustrating an electronic device and external electronic devices, according to an embodiment.

According to an embodiment, an electronic device 201 (e.g., the electronic device 101 of FIG. 1) may perform wireless communication with a plurality of external electronic devices (e.g., the electronic devices 102 and 104 or the server 108 of FIG. 1). In an embodiment, for example, the electronic device 201 may perform wireless communication with a first external electronic device 202 and a second external electronic device 203 over a short range communication network (e.g., Bluetooth™, Wi-Fi, and/or ultra wideband (UWB)). In an alternative embodiment, a first external electronic device 202 and a second external electronic device 203 may perform wireless communication over a long range communication network (e.g., a cellular network, an Internet, or a computer network (e.g., LAN or WAN)).

In an embodiment, the electronic device 201 may include a processor 220 (e.g., the processor 120 of FIG. 1), a memory 230 (e.g., the memory 130 of FIG. 1), and a communication circuit 290 (e.g., the communication circuit 190 of FIG. 1). The components of the electronic device 201 illustrated in FIG. 2 is exemplary, and embodiments of the disclosure are not limited thereto. In an alternative embodiment, for example, the electronic device 201 may further include components (e.g., the display device 160 or the camera module 180 of FIG. 1) not illustrated in FIG. 2.

In an embodiment, the first external electronic device 202 and the second external electronic device 203 may be referenced as (or defined by) a device whose type is substantially identical to that of the electronic device 201. For example, the electronic device 201, the first external electronic device 202, and the second external electronic device 203 may be a portable communication device (e.g., a smartphone), a computer device, a portable multimedia device, a portable medical device, a camera, a wearable device, or home appliances. All or some of operations that the electronic device 201 will perform may be executed by the first external electronic device 202 and/or the second external electronic device 203.

In an alternative embodiment, the first external electronic device 202 and the second external electronic device 203 may be referenced as (or defined by) a device whose type is different from that of the electronic device 201. For example, the electronic device 201 may be a portable communication device, and the first external electronic device 202 and/or the second external electronic device 203 may be a wearable device.

In an embodiment, the processor 220 may establish the wireless connection with at least one external electronic device by using the communication circuit 290. For example, the processor 220 may establish the wireless connection with the first external electronic device 202 and/or the second external electronic device 203 by using the short range communication network (e.g., Wi-Fi).

In an embodiment, the processor 220 may determine the number of wireless connections with an external electronic device that will perform wireless communication.

For example, the processor 220 may identify the number of available wireless connections of the electronic device 201. Here, the first number may denote the number of available wireless connections of the electronic device 201. For example, the processor 220 may identify status information of the electronic device 201 based on a specified period and may identify the first number of available wireless connections of the electronic device 201 based on the identified status information. In an embodiment, the status information of the electronic device 201 may include a power state of the electronic device 201, a heat generation state of the electronic device 201, wireless communication performance of the electronic device 201, and/or information about external electronic devices communicating therewith.

In an embodiment, in the case where an external electronic device that will perform wireless communication with the electronic device 201 is the first external electronic device 202, the processor 220 may receive the second number from the first external electronic device 202 by using the communication circuit 290. In an alternative embodiment, the processor 220 may receive information about the second number from the first external electronic device 202 by using the communication circuit 290 and may determine the second number based on the second information. Here, the second number may denote the number of available wireless connections of the first external electronic device 202.

For example, the processor 220 may identify the third number based on the first number and the second number. For example, the processor 220 may identify the third number based on the number of allocation connections to be allocated to a resource manager from among the first number and the second number. In an embodiment, the number of allocation connections may be equal to the first number. In an alternative embodiment, the number of allocation connections may be a natural number less than the first number. Here, the third number may denote the number of wireless connections to be used for data transmission and reception between the electronic device 201 and the first external electronic device 202.

In an embodiment, the processor 220 may determine one having a less value from among (or the less one selected from) the first number and the second number as the third number of wireless connections to be used for data transmission and reception with the first external electronic device 202. In an alternative embodiment, the processor 220 may determine one having a less value from among the number of allocation connections and the second number as the third number of wireless connections to be used for data transmission and reception with the first external electronic device 202.

In an embodiment, the processor 220 may determine one having a greater value from among (or the greater one selected from) the first number and the second number as the third number of wireless connections to be used for data transmission and reception with the first external electronic device 202. In an alternative embodiment, the processor 220 may determine one having a greater value from among the number of allocation connections and the second number as the third number of wireless connections to be used for data transmission and reception with the first external electronic device 202.

In an embodiment, the processor 220 may determine a device receiving data from among the electronic device 201 and the first external electronic device 202 and may determine the number of available wireless connections of the identified device as the third number of wireless connections to be used for data transmission and reception with the first external electronic device 202. For example, in the case where the device receiving data is the electronic device 201, the processor 220 may determine the first number or the number of allocation connections as the third number of wireless connections to be used for data transmission and reception with the first external electronic device 202. In an alternative embodiment, in the case where the device receiving data is the first external electronic device 202, the processor 220 may determine the second number as the third number of wireless connections to be used for data transmission and reception with the first external electronic device 202.

In an embodiment, the processor 220 may establish the third number of wireless connections with the first external electronic device 202.

In an embodiment, the processor 220 may transmit/receive data (e.g., a plurality of data packets) with the first external electronic device 202 based on the established wireless connections. For example, the processor 220 may transmit/receive data with the first external electronic device 202 by using the third number of wireless connections.

In an embodiment, the processor 220 may identify the number of available wireless connections of the electronic device 201 based on a specified period.

For example, while transmitting/receiving data with the first external electronic device 202 by using the third number of wireless connections, the processor 220 may identify the number of remaining available wireless connections of the electronic device 201 except for the third number of the wireless connections. For example, the processor 220 may continuously transmit/receive data with the first external electronic device 202 by using one wireless connection among the third number and the identified number of the remaining available wireless connections of the electronic device 201 except for the third number of the wireless connections.

In an embodiment, while communicating with the first external electronic device 202, the processor 220 may receive a fourth number from the second external electronic device 203 by using the communication circuit 290. In an alternative embodiment, in a state where the communication with the first external electronic device 202 is not performed, the processor 220 may receive the fourth number from the second external electronic device 203 by using the communication circuit 290. In another alternative embodiment, the processor 220 may receive information about the fourth number from the second external electronic device 203 through the communication circuit 290 and may determine the fourth number based on the received information. Here, the fourth number may denote the number of available wireless connections of the second external electronic device 203.

In an embodiment, the processor 220 may identify a fifth number based on the first number, the third number, and the fourth number. For example, the processor 220 may identify the fifth number based on the number of allocation connections to be allocated to the resource manager from among the first number, the third number and the fourth number. For example, the number of allocation connections may be equal to the first number. Alternatively, the number of allocation connections may be a natural number less than the first number. Here, the fifth number may denote the number of wireless connections to be used for data transmission and reception between the electronic device 201 and the second external electronic device 203. For example, the first number to the fifth number may include an integer value of 0 or greater, and a sum of the third number and the fifth number may be less than or equal to the first number.

In an embodiment, the memory 230 may store a command or data. For example, the memory 230 may store one or more instructions that, when executed by the processor 220, cause the electronic device 201 to perform various operations. In an embodiment, the memory 230 may store information about a plurality of functions that the electronic device 201 provides. In an embodiment, the memory 230 may include the number of available wireless connections of the electronic device 201, a power state of the electronic device 201, a heat generation state of the electronic device 201, wireless communication performance of the electronic device 201, and/or information about external electronic devices communicating therewith. In an embodiment, the memory 230 may at least temporarily store the number of available wireless connections (e.g., the second number to the fifth number).

In an embodiment, the communication circuit 290 may support establishing a communication channel (e.g., a wireless communication channel) between the electronic device 201 and a plurality of external electronic devices (e.g., the first external electronic device 202 and/or the second external electronic device 203) and support performing communication over the established communication channel. For example, the communication circuit 290 may include a Wi-Fi communication module. The electronic device 201 may transmit and/or receive various electrical signals with the first external electronic device 202 and/or the second external electronic device 203 over the communication circuit 290, based on the Wi-Fi communication.

Figure 3:
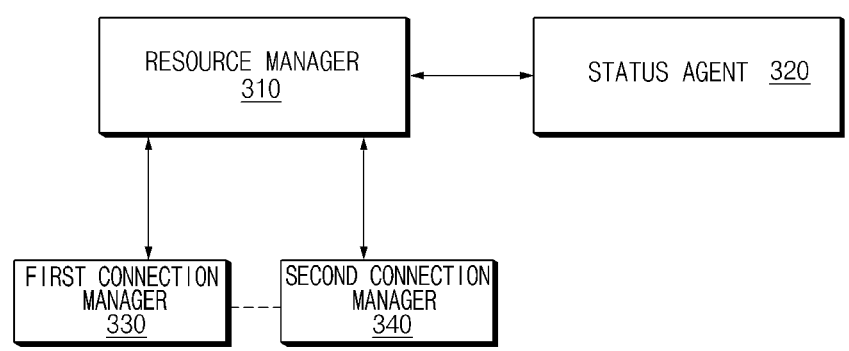
FIG. 3 is a block diagram illustrating software components that an electronic device includes, according to an embodiment.

FIG. 3 is a block diagram illustrating software components that an electronic device includes, according to an embodiment.

In an embodiment, an electronic device (e.g., the electronic device 201 of FIG. 2) may store, in a memory (e.g., the memory 230 of FIG. 2), a program (e.g., the program 140) including an operating system (e.g., the operating system 142 of FIG. 1) for controlling one or more resources, a middleware (e.g., the middleware 144 of FIG. 1), or one or more applications (e.g., the application 146 of FIG. 1) executable in the operating system.

In an embodiment, the middleware may provide various functions that allow a processor (e.g., the processor 220 of FIG. 2) to use a function or information provided from one or more resources of the electronic device. For example, the middleware may include a resource manager 310, a status agent 320, at least one connection manager (e.g., a first connection manager 330 and/or a second connection manager 340).

For example, the resource manager 310 may manage a source code or a space of the memory. For example, the resource manager 310 may manage the number of wireless resources and/or wireless connections used for the electronic device to perform wireless communication.

For example, the resource manager 310 may create the first connection manager 330 for the purpose of data transmission and reception with a first external electronic device. The resource manager 310 may allocate the number of wireless resources and/or wireless connections to the first connection manager 330 thus created.

For example, the resource manager 310 may identify the number of available wireless connections of the electronic device based on status information. Here, the number of available wireless connections of the electronic device may be referred to as the first number.

For example, the resource manager 310 may identify the first number and may allocate the number of wireless connections to the first connection manager 330 based on the first number. For example, a processor (e.g., the processor 220 of FIG. 2) may allocate allocation connections, the number of which is less than or equal to the first number, to the resource manager 310. The resource manager 310 may allocate at least some of the number of allocation connections allocated by the processor to the first connection manager 330. For example, the status information may be obtained from the status agent 320.

For example, the resource manager 310 may receive information about the number of available wireless connections of the first external electronic device from the first external electronic device and may allocate the number of wireless connections to the first connection manager 330 based on the available wireless connections of the first external electronic device thus received. Here, the number of available wireless connections of the first external electronic device may be referred to as the second number.

For example, the resource manager 310 may identify the third number based on the first number and the second number and may allocate the number of wireless connections to the first connection manager 330 based on the third number. For example, the resource manager 310 may identify the third number based on the number of allocation connections to be allocated to the resource manager 310 from among the first number and the second number. In an embodiment, the number of allocation connections may be equal to the first number. In an alternative embodiment, the number of allocation connections may be a natural number less than the first number.

For example, in the case where the electronic device performs wireless communication with the first external electronic device, the resource manager 310 may manage wireless connections with the first external electronic device by using the first connection manager 330. For example, when the third number of wireless connections to be used in data transmission and reception with the first external electronic device is identified, the resource manager 310 may create the first connection manager 330 and may allocate the third number to the first connection manager 330 thus created.

For example, the status agent 320 may include a power manager and/or a Wi-Fi manager. For example, the status agent 320 may obtain status information of the electronic device based on a specified period.

For example, the status agent 320 may obtain information about a capacity, a temperature, or a power of a battery by using the power manager. For example, the status agent 320 may obtain information about wireless communication performance of the electronic device by using the Wi-Fi manager.

For example, the status agent 320 may transmit the obtained status information to the resource manager 310.

For example, when the data transmission and reception with the first external electronic device is completed, the resource manager 310 may terminate (or delete) the first connection manager 330.

The software components illustrated in FIG. 3 is exemplary, and embodiments of the disclosure are not limited thereto. For example, the software components that the electronic device includes may be implemented with one software module. Alternatively, the software components that the electronic device includes may be implemented in a state where at least two or more software modules are merged. Alternatively, the electronic device may include a plurality of software components that are implemented with one software module. In an embodiment, the software components may be implemented in various forms such that the above operations described with reference to FIG. 3 are performed and are not limited to the components described with reference to FIG. 3.

Figure 4:
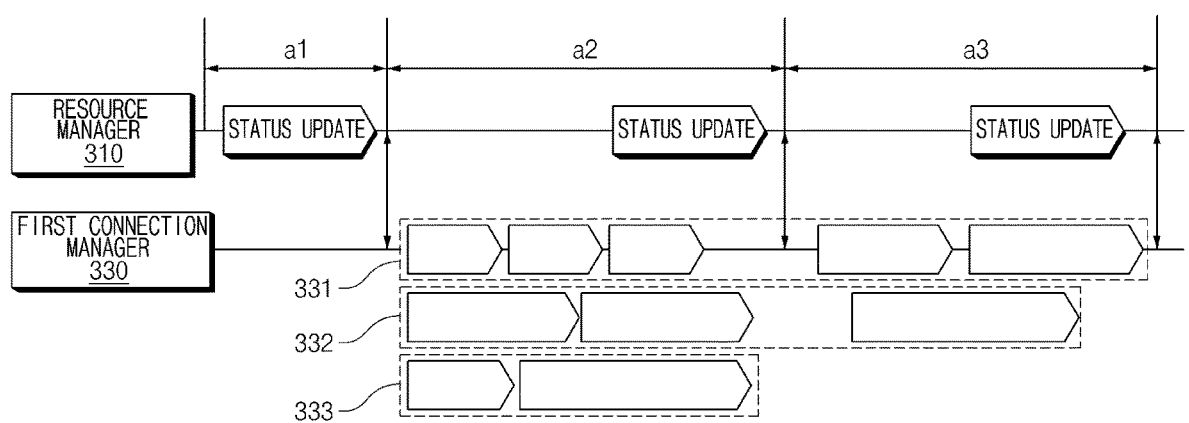
FIG. 4 illustrates a process in which an electronic device transmits a plurality of data packets to an external electronic device, according to an embodiment.

FIG. 4 illustrates a process in which an electronic device transmits a plurality of data packets to an external electronic device, according to an embodiment.

According to an embodiment, an electronic device (e.g., the electronic device 101 of FIG. 1 or the electronic device 201 of FIG. 2) may transmit/receive data with at least one external electronic device (e.g., the first external electronic device 202 of FIG. 2) by using the resource manager 310 and the first connection manager 330.

In an embodiment, in a first time period a1, the electronic device may identify the number of wireless connections to be established with the external electronic device by using the resource manager 310. The electronic device may identify the number of available wireless connections based on various criterions and/or information. The resource manager 310 may identify the third number of wireless connections to be used for data transmission and reception with the external electronic device, based on the first number of available wireless connections of the electronic device and the second number of available wireless connections of the external electronic device that will perform communication therewith. For example, the resource manager 310 may identify the third number based on the number of allocation connections to be allocated to the resource manager 310 from among the first number and the second number. For example, the number of allocation connections may be equal to the first number. Alternatively, the number of allocation connections may be a natural number less than the first number.

For example, the resource manager 310 may identify the first number of available wireless connections of the electronic device based on first status information. For example, the resource manager 310 may receive the first status information of the electronic device that the status agent (e.g., the status agent 320 of FIG. 3) acquires and may identify the first number of available wireless connections of the electronic device based on the first status information thus received. In an embodiment, the first status information of the electronic device may include a power state of the electronic device, a heat generation state of the electronic device, wireless communication performance of the electronic device, and/or information about external electronic devices communicating therewith.

For example, the resource manager 310 may identify the second number of available wireless connections of the first external electronic device. In an embodiment, the electronic device may transmit a signal requesting the second number of available wireless connections to the first external electronic device and may receive the second number of available wireless connections of the first external electronic device from the first external electronic device as a response to the transmission.

For example, the resource manager 310 may identify the third number of wireless connections to be used for data transmission and reception with the first external electronic device, based on the first number and the second number. For example, the resource manager 310 may identify the third number based on the number of allocation connections to be allocated to the resource manager 310 from among the first number and the second number. For example, the number of allocation connections may be equal to the first number. Alternatively, the number of allocation connections may be a natural number less than the first number.

In an embodiment, the electronic device may determine one having a less value from among the first number and the second number as the third number of wireless connections to be used for data transmission and reception with the first external electronic device. In an alternative embodiment, the electronic device may determine one having a less value from among the number of allocation connections and the second number as the third number of wireless connections to be used for data transmission and reception with the first external electronic device.

In an embodiment, the electronic device may determine one having a greater value from among the first number and the second number as the third number of wireless connections to be used for data transmission and reception with the first external electronic device. In an alternative embodiment, the electronic device may determine one having a greater value from among the number of allocation connections and the second number as the third number of wireless connections to be used for data transmission and reception with the first external electronic device.

In an embodiment, the resource manager 310 may identify a device receiving data from among the electronic device and the first external electronic device. The resource manager 310 may determine the number of available wireless connections of the identified device as the third number of wireless connections to be used for data transmission and reception with the first external electronic device. For example, in the case where the device receiving data is the electronic device, the electronic device may determine the first number or the number of allocation connections as the third number of wireless connections to be used for data transmission and reception with the first external electronic device. For example, in the case where the device receiving data is the first external electronic device, the electronic device may determine the second number as the third number of wireless connections to be used for data transmission and reception with the first external electronic device.

For example, the resource manager 310 may create the first connection manager 330 to be used for communication with the first external electronic device and may register the first connection manager 330 at the resource manager 310.

For example, the resource manager 310 may allocate the third number to the first connection manager 330. The first connection manager 330 may transmit/receive data with the first external electronic device over a connection path of the third number, that is, three connection paths. The third number is illustrated in FIG. 4 as being "3". However, "3" is only an exemplary digit, and embodiments of the disclosure are not limited thereto.

In an embodiment, in a second time period a2, the electronic device may transmit/receive data with the first external electronic device corresponding to the first connection manager 330 over the connection path of the third number determined and/or identified by using the resource manager 310.

For example, the first connection manager 330 may transmit/receive data with the first external electronic device over a first connection path 331, a second connection path 332, and a third connection path 333.

For example, in the second time period a2, the first connection manager 330 may transmit/receive 3 data with the first external electronic device over the first connection path 331.

For example, in the second time period a2, the first connection manager 330 may transmit/receive 2 data with the first external electronic device over the second connection path 332.

For example, in the second time period a2, the first connection manager 330 may transmit/receive 2 data with the first external electronic device over the third connection path 333.

For example, in the second time period a2, the resource manager 310 may receive second status information of the electronic device from a status agent. The second status information may include information different from the first status information.

In an embodiment, a heat generation value of the electronic device included in the second status information may be greater than a heat generation value of the electronic device included in the first status information.

In an embodiment, a power value of the electronic device included in the second status information may be less than a power value of the electronic device included in the first status information.

In an embodiment, the number of available wireless connections of the electronic device included in the second status information may be less than the number of available wireless connections of the electronic device included in the first status information.

For example, the resource manager 310 may update the fourth number of wireless connections to be used for data transmission and reception with the first external electronic device, based on the received second status information. The resource manager 310 may allocate the fourth number thus updated to the first connection manager 330. The fourth number is illustrated in FIG. 4 as being "2". However, "2" is only an exemplary digit, and embodiments of the disclosure are not limited thereto.

In an embodiment, in a third time period a3, the electronic device may transmit/receive data with the first external electronic device corresponding to the first connection manager 330 over the connection path of the fourth number updated by using the resource manager 310.

For example, the first connection manager 330 may transmit/receive data with the first external electronic device over the first connection path 331 and the second connection path 332.

For example, in the third time period a3, the first connection manager 330 may transmit/receive 2 data with the first external electronic device over the first connection path 331.

For example, in the third time period a3, the first connection manager 330 may transmit/receive 1 data with the first external electronic device over the second connection path 332.

For example, in the third time period a3, the resource manager 310 may receive third status information of the electronic device from the status agent. The third status information may include information different from the first status information and the second status information.

In an embodiment, the third status information may include information indicating that the data transmission and reception between the electronic device and the external electronic device is terminated.

For example, the resource manager 310 may check that the data transmission and reception with the first external electronic device is terminated, based on the third status information and may deregister the first connection manager 330 from the resource manager 310.

Hereinafter, a method in which an electronic device and at least one external electronic device perform wireless communication will be described with reference to FIGS. 5 and 6. The same or like features of the method to be described with reference to FIGS. 5 and 6 as those described above with reference to FIGS. 2 to 4 will hereinafter be omitted or simplified.

Figure 5:
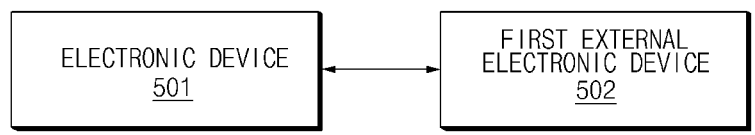
FIG. 5 is a block diagram illustrating an electronic device and an external electronic device, according to an embodiment.

FIG. 5 is a block diagram illustrating an electronic device and an external electronic device, according to an embodiment.

In an embodiment, an electronic device 501 (e.g., the electronic device 101 of FIG. 1 or the electronic device 201 of FIG. 2) may transmit/receive data with a first external electronic device 502 (e.g., the electronic device 102 of FIG. 1 or the first external electronic device 202 of FIG. 2).

In an embodiment, the electronic device 501 may establish the third number of wireless connections with the first external electronic device 502 and may transmit/receive data by using the third number of wireless connections. The electronic device 501 may transmit/receive data with the first external electronic device 502 based on the wireless connection establishing method described with reference to FIGS. 2 to 4.

Figure 6:
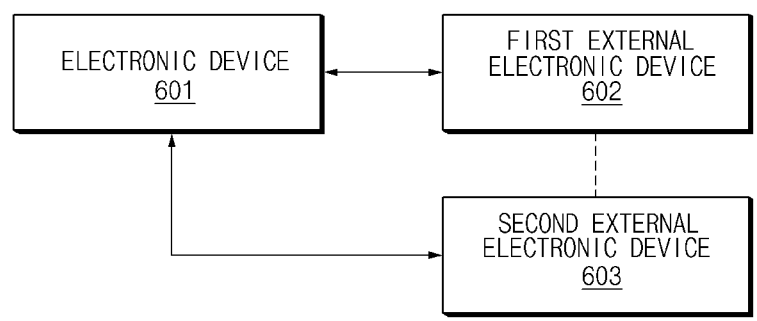
FIG. 6 is a block diagram illustrating an electronic device and an external electronic device, according to an embodiment.

FIG. 6 is a block diagram illustrating an electronic device and an external electronic device, according to an embodiment.

In an embodiment, an electronic device 601 (e.g., the electronic device 101 of FIG. 1 or the electronic device 201 of FIG. 2) may transmit/receive data with a first external electronic device 602 (e.g., the first external electronic device 202 of FIG. 2) and a second external electronic device 603 (e.g., the second external electronic device 203 of FIG. 2).

In an embodiment, the electronic device 601 may identify the first number of available wireless connections of the electronic device 601 and may receive the second number of available wireless connections of the first external electronic device 602 from the first external electronic device 602. For example, the electronic device 601 may determine and/or identify the third number of wireless connections to be used for data transmission and reception with the first external electronic device 602, based on the first number and the second number. Alternatively, the electronic device 601 may determine and/or identify, for example, the third number based on the number of allocation connections to be allocated to a resource manager (e.g., the resource manager 310 of FIG. 3) from among the first number and the second number. For example, the number of allocation connections may be equal to the first number. Alternatively, the number of allocation connections may be a natural number less than the first number. The electronic device 601 may establish the third number of wireless connections thus determined and/or identified, with the first external electronic device 602.

In an embodiment, the electronic device 601 may receive the fourth number of available wireless connections of the second external electronic device 603 from the second external electronic device 603. For example, the electronic device 601 may determine and/or identify the fifth number of wireless connections to be used for data transmission and reception with the second external electronic device 603, based on the first number, the third number, and the fourth number. Alternatively, the electronic device 601 may determine and/or identify the fifth number based on the number of allocation connections to be allocated to the resource manager from among the first number, the third number, and the fourth number. The electronic device 601 may establish the fifth number of wireless connections thus determined and/or identified, with the second external electronic device 603. For example, a sum of the third number and the fifth number may be less than or equal to the first number.

Figure 7:
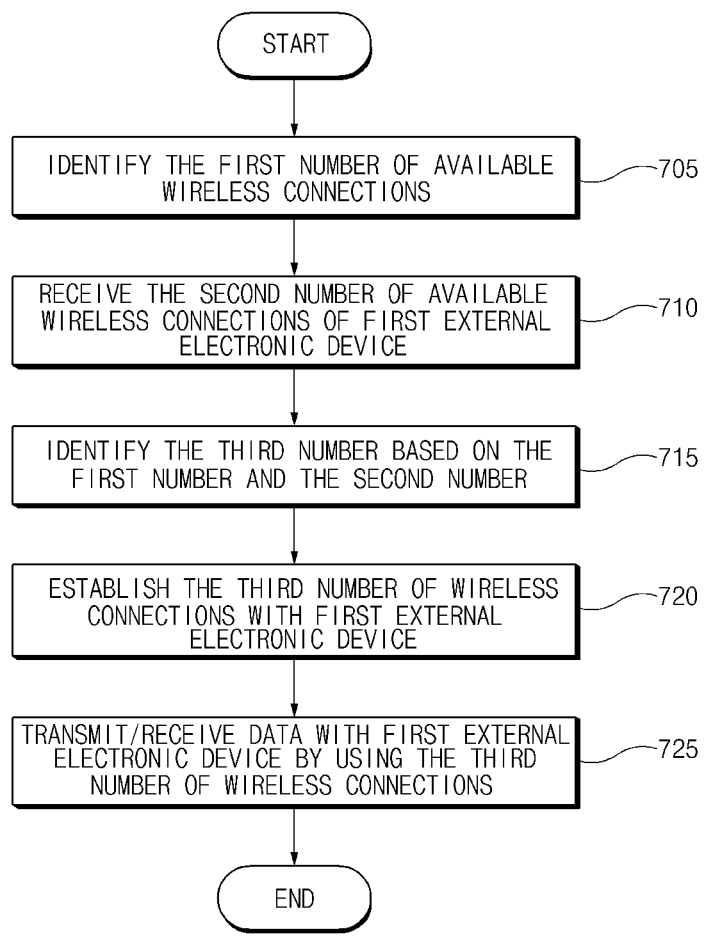
FIG. 7 is an operation flowchart of an electronic device, according to an embodiment.

FIG. 7 is an operation flowchart of an electronic device, according to an embodiment.

According to an embodiment, an electronic device (e.g., the electronic device 101 of FIG. 1 or the electronic device 201 of FIG. 2) may perform operations illustrated in FIG. 7. For example, a processor (e.g., the processor 120 of FIG. 1 or the processor 220 of FIG. 2) of the electronic device may be configured to perform the operations of FIG. 7 when instructions stored in a memory (e.g., the memory 130 of FIG. 1 or the memory 230 of FIG. 2) are executed.

In operation 705, the electronic device may identify the first number of available wireless connections. For example, the electronic device may identify the first number of available wireless connections of the electronic device based on status information of the electronic device.

In operation 710, the electronic device may receive the second number of available wireless connections of a first external electronic device (e.g., the first external electronic device 202 of FIG. 2) from the first external electronic device. For example, the electronic device may transmit a signal requesting the number of available wireless connections of the first external electronic device by using a communication circuit (e.g., the communication circuit 290 of FIG. 2). Alternatively, the electronic device may receive the second number of available wireless connections, which the first external electronic device broadcasts, by using the communication circuit.

In operation 715, the electronic device may identify the third number based on the first number and the second number. For example, the electronic device may determine one having a small value from among the first number and the second number as the third number of wireless connections to be used for data transmission and reception with the first external electronic device. Alternatively, the electronic device may determine one having a great value from among the first number and the second number as the third number of wireless connections to be used for data transmission and reception with the first external electronic device. Alternatively, the electronic device may determine a device receiving data from among the electronic device and the first external electronic device and may determine the number of available wireless connections of the identified device as the third number of wireless connections to be used for data transmission and reception with the first external electronic device.

In operation 720, the electronic device may establish the third number of wireless connections with the first external electronic device.

In operation 725, the electronic device may transmit/receive data with the first external electronic device by using the third number of wireless connections. For example, over the connection path of the third number, the electronic device may transmit a plurality of data packets to the first external electronic device or may receive a plurality of data packets from the first external electronic device.

Figure 8:
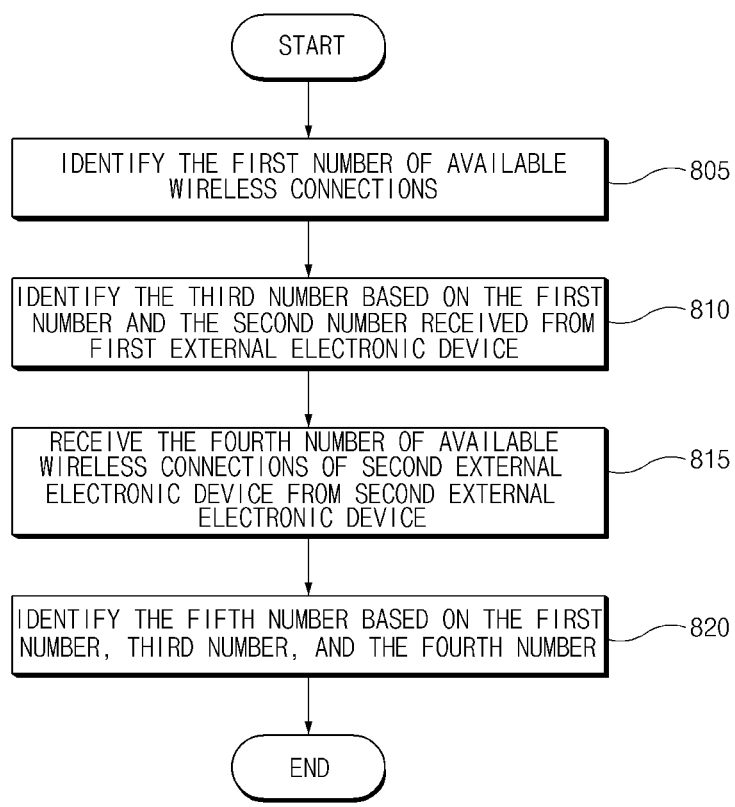
FIG. 8 is an operation flowchart of an electronic device, according to an embodiment.

FIG. 8 is an operation flowchart of an electronic device, according to an embodiment.

According to an embodiment, an electronic device (e.g., the electronic device 101 of FIG. 1 or the electronic device 201 of FIG. 2) may perform operations illustrated in FIG. 8. For example, a processor (e.g., the processor 120 of FIG. 1 or the processor 220 of FIG. 2) of the electronic device may be configured to perform the operations of FIG. 8 when instructions stored in a memory (e.g., the memory 130 of FIG. 1 or the memory 230 of FIG. 2) are executed.

In operation 805, the electronic device may identify the first number of available wireless connections. For example, the electronic device may identify the first number of available wireless connections of the electronic device based on status information of the electronic device.

In operation 810, the electronic device may identify the third number based on the first number and the second number. Alternatively, the electronic device may determine and/or identify, for example, the third number based on the number of allocation connections to be allocated to a resource manager (e.g., the resource manager 310 of FIG. 3) from among the first number and the second number. For example, the number of allocation connections may be equal to the first number. Alternatively, the number of allocation connections may be a natural number less than the first number. For example, the second number may be received from a first external electronic device (e.g., the first external electronic device 202 of FIG. 2) by using a communication circuit (e.g., the communication circuit 290 of FIG. 2). The electronic device may identify the third number based on the first number or the number of allocation connections and the second number and may establish the third number of wireless connections with the first external electronic device.

In operation 815, the electronic device may receive the fourth number of available wireless connections of a second external electronic device (e.g., the second external electronic device 203 of FIG. 2) from the second external electronic device.

In operation 820, the electronic device may identify the fifth number based on the first number, the second number, the third number, and the fourth number. For example, the fifth number may denote the number of wireless connections to be used for data transmission and reception between the electronic device and the second external electronic device. For example, a sum of the third number and the fifth number may be less than or equal to the first number.

Figure 9:
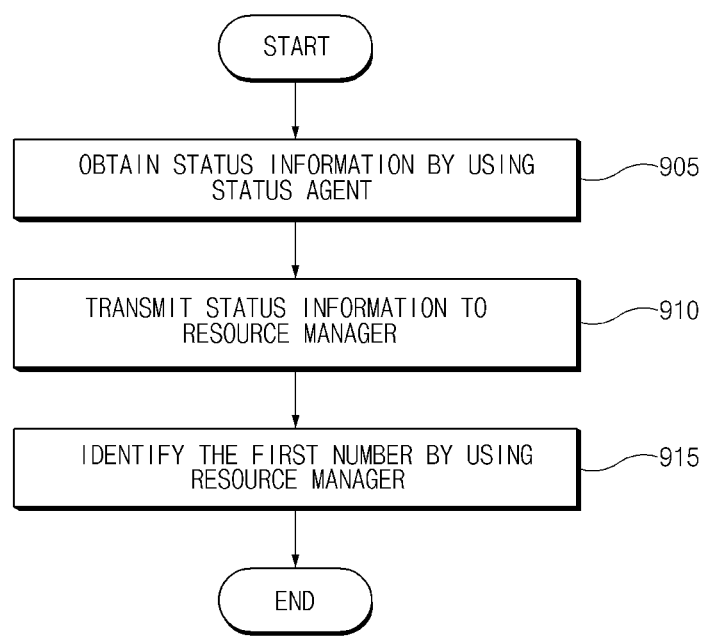
FIG. 9 is an operation flowchart of an electronic device, according to an embodiment.

FIG. 9 is an operation flowchart of an electronic device, according to an embodiment.

According to an embodiment, an electronic device (e.g., the electronic device 101 of FIG. 1 or the electronic device 201 of FIG. 2) may perform operations illustrated in FIG. 9. For example, a processor (e.g., the processor 120 of FIG. 1 or the processor 220 of FIG. 2) of the electronic device may be configured to perform the operations of FIG. 9 when instructions stored in a memory (e.g., the memory 130 of FIG. 1 or the memory 230 of FIG. 2) are executed.

In operation 905, the electronic device may obtain status information by using a status agent (e.g., the status agent 320 of FIG. 3). For example, the electronic device may obtain the status information by using the status agent, based on a specified period. In an embodiment, the status information may include a power state of the electronic device, a heat generation state of the electronic device, wireless communication performance of the electronic device, and/or information about external electronic devices communicating.

In operation 910, the electronic device may transmit the status information obtained by the status agent to a resource manager (e.g., the resource manager 310 of FIG. 4). For example, the electronic device may allow the processor to transmit the status information, which is obtained by the status agent based on the specified period, to the resource manager.

In operation 915, the electronic device may identify the first number by using the resource manager. For example, the electronic device may identify the first number of available wireless connections of the electronic device based on the status information, by using the resource manager. For example, the electronic device may update the number of available wireless connections of the electronic device, based on a change of the status information received based on the specified period.

Figure 10:
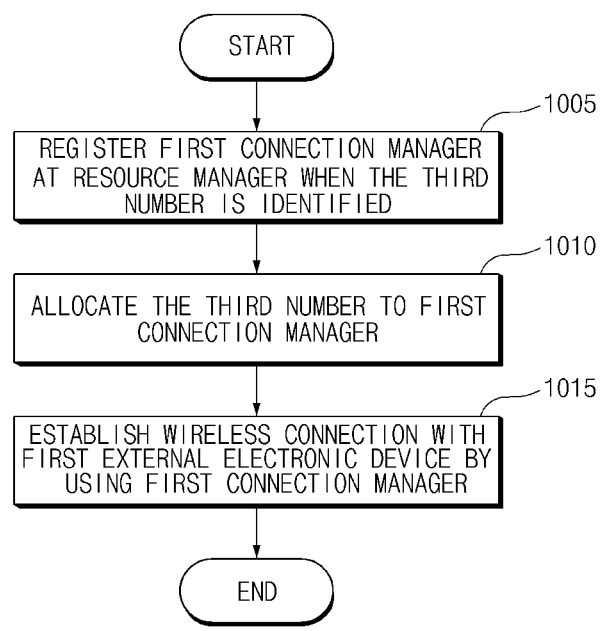
FIG. 10 is an operation flowchart of an electronic device, according to an embodiment.

FIG. 10 is an operation flowchart of an electronic device, according to an embodiment.

According to an embodiment, an electronic device (e.g., the electronic device 101 of FIG. 1 or the electronic device 201 of FIG. 2) may perform operations illustrated in FIG. 10. For example, a processor (e.g., the processor 120 of FIG. 1 or the processor 220 of FIG. 2) of the electronic device may be configured to perform the operations of FIG. 10 when instructions stored in a memory (e.g., the memory 130 of FIG. 1 or the memory 230 of FIG. 2) are executed.

In operation 1005, the electronic device may register a first connection manager (e.g., the first connection manager 330 of FIG. 3) at a resource manager (e.g., the resource manager 310 of FIG. 3) when the third number is identified.

For example, the third number may be determined based on the first number of available wireless connections of the electronic device and the second number of available wireless connections of a first external electronic device (e.g., the first external electronic device 202 of FIG. 2) and the third number may denote or be referenced as the number of wireless connections to be used for data transmission and reception with the electronic device and the first external electronic device. Alternatively, the third number may be determined based on the number of allocation connections to be allocated to a resource manager (e.g., the resource manager 310 of FIG. 3) from among the first number and the second number and the third number may denote or be referenced as the number of wireless connections to be used for data transmission and reception with the electronic device and the first external electronic device. For example, the number of allocation connections may be equal to the first number. Alternatively, the number of allocation connections may be a natural number less than the first number.

In operation 1010, the electronic device may allocate the third number to a first connection manager.

In operation 1015, the electronic device may establish wireless connection with the first external electronic device by using the first connection manager. For example, the electronic device may establish wireless connection with the first external electronic device over a connection path of the third number, by using the first connection manager.

An operation in which the resource manager establishes wireless connection with the external electronic device through the first connection manager is described with reference to FIG. 10, but embodiments of the disclosure are not limited thereto. In an alternative embodiment, for example, the resource manager may establish wireless connection with another external electronic device (e.g., the second external electronic device 203 of FIG. 2) by using a separate connection manager (e.g., the second connection manager 340 of FIG. 3), independently of the operation of establishing wireless connection with the first external electronic device through the first connection manager. In such an embodiment, when the electronic device is establishing wireless connection with the first external electronic device, the resource manager may determine the number of wireless connections with the another external electronic device in consideration of the number of wireless connections with the first external electronic device (e.g., the third number).

Figure 11:
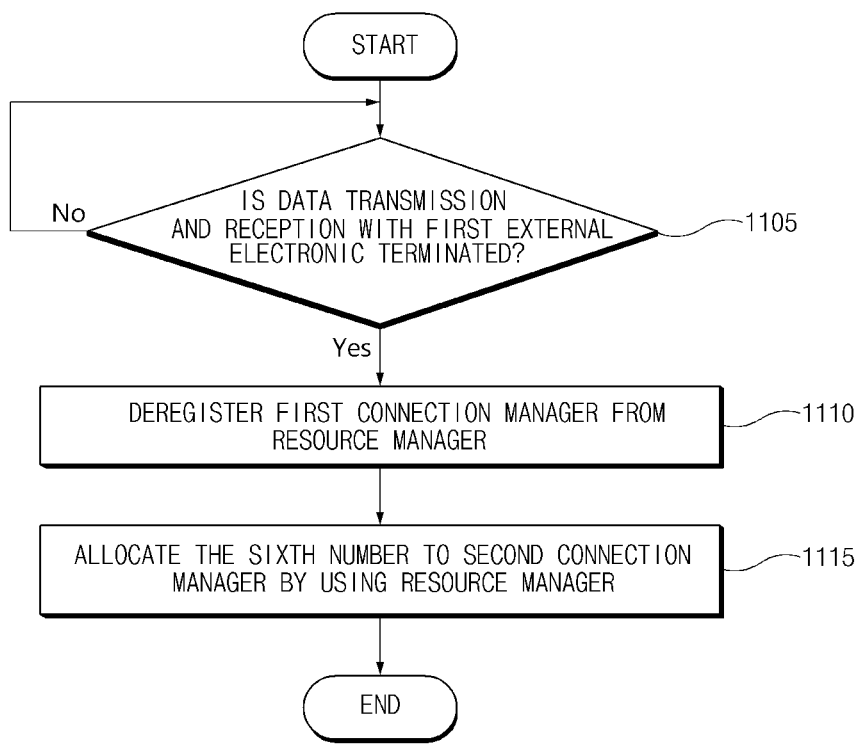
FIG. 11 is an operation flowchart of an electronic device, according to an embodiment.

FIG. 11 is an operation flowchart of an electronic device, according to an embodiment.

According to an embodiment, an electronic device (e.g., the electronic device 101 of FIG. 2) may perform operations illustrated in FIG. 11. For example, a processor (e.g., the processor 120 of FIG. 1 or the processor 220 of FIG. 2) of the electronic device may be configured to perform the operations of FIG. 11 when instructions stored in a memory (e.g., the memory 130 of FIG. 1) are executed.

In operation 1105, the electronic device may determine whether the data transmission and reception with a first external electronic device (e.g., the first external electronic device 202 of FIG. 2) is terminated. For example, the electronic device may identify a transmission and reception status with external electronic devices based on a specified period, by using a status agent (e.g., the status agent 320 of FIG. 3).

For example, when it is determined the data transmission and reception of the electronic device and the first external electronic device is terminated (e.g., operation 1105—Yes), the electronic device may perform operation 1110.

For example, when it is determined the data transmission and reception of the electronic device and the first external electronic device is not terminated (e.g., operation 1105—No), the electronic device may repeatedly perform operation 1105.

In operation 1110, the electronic device may deregister a first connection manager (e.g., the first connection manager 330 of FIG. 3) from a resource manager (e.g., the resource manager 310 of FIG. 3). For example, when it is determined the data transmission and reception of the electronic device and the first external electronic device is terminated, the electronic device may deregister the first connection manager, which is created for the purpose of the data transmission and reception with the first external electronic device and is then registered at the resource manager, from the resource manager.

In operation 1115, the electronic device may allocate a sixth number to a second connection manager (e.g., the second connection manager 340 of FIG. 3) by using the resource manager. For example, when it is determined the data transmission and reception of the electronic device and the first external electronic device is terminated and that data transmission and reception of the electronic device and the second external electronic device is being performed, the electronic device may allocate the sixth number to the second connection manager associated with the data transmission and reception with the second external electronic device. For example, the sixth number may denote or be referenced as a number greater than the fifth number previously allocated to the second connection manager.

According to an embodiment of the disclosure, an electronic device may include a communication circuit, a processor, and a memory that stores instructions. The instructions, when executed by the processor, may cause the electronic device to identify the first number of available wireless connections of the electronic device, to receive the second number of available wireless connections of a first external electronic device of a plurality of external electronic devices by using the communication circuit, to identify the third number of wireless connections to be used for data transmission and reception with the first external electronic device, based on the first number thus identified and the second number thus received, to establish the third number of the wireless connections with the first external electronic device, and to transmit/receive data with the first external electronic device by using the third number of the wireless connections.

According to an embodiment, the instructions, when executed by the processor, may cause the electronic device to identify status information of the electronic device and to identify the first number of the available wireless connections of the electronic device based on the status information thus identified.

According to an embodiment, the instructions, when executed by the processor, may cause the electronic device to determine one having a small value from among the first number thus identified and the second number thus received, as the third number of the wireless connections to be used for the data transmission and reception with the first external electronic device.

According to an embodiment, the instructions, when executed by the processor, may cause the electronic device to determine one having a great value from among the first number thus identified and the second number thus received, as the third number of the wireless connections to be used for the data transmission and reception with the first external electronic device.

According to an embodiment, the instructions, when executed by the processor, may cause the electronic device to determine a device receiving the data from among the electronic device and the first external electronic device and to determine the number of available wireless connections of the device thus identified as the third number of the wireless connections to be used for the data transmission and reception with the first external electronic device.

According to an embodiment, the instructions, when executed by the processor, may cause the electronic device to identify the number of available wireless connections of the electronic device except for the third number while transmitting/receiving the data with the first external electronic device by using the third number of the wireless connections and to continue to transmit/receive the data by using a wireless connection of one of the third number and the number of the available wireless connections of the electronic device except for the third number thus identified.

According to an embodiment, the instructions, when executed by the processor, may cause the electronic device to receive the fourth number of available wireless connections of a second external electronic device of the plurality of external electronic devices by using the communication circuit and to identify the fifth number of wireless connections to be used for data transmission and reception with the second external electronic device, based on the first number, the third number, and the fourth number.

According to an embodiment, a sum of the third number and the fifth number may be less than or equal to the first number.

According to an embodiment, the electronic device may further include a resource manager and a status agent stored in the memory.

According to an embodiment, the instructions, when executed by the processor, may cause the electronic device to obtain status information of the electronic device based on a specified period by using the status agent, to transmit the status information thus obtained to the resource manager, and to identify the first number of the available wireless connections of the electronic device based on the status information by using the resource manager.

According to an embodiment, when the third number of the wireless connections to be used for the data transmission and reception with the first external electronic device is identified, the instructions, when executed by the processor, may cause the electronic device to create a first connection manager, to register the first connection manager at the resource manager, and to allocate the third number to the first connection manager. When the fifth number of the wireless connections to be used for the data transmission and reception with the second external electronic device is identified, the instructions, when executed by the processor, may cause the electronic device to create a second connection manager, to register the second connection manager at the resource manager, and to allocate the fifth number to the second connection manager.

According to an embodiment, when the data transmission and reception with the first external electronic device is identified as being terminated, the instructions, when executed by the processor, may cause the electronic device to deregister the first connection manager from the resource manager and to allocate the sixth number to the second connection manager by using the resource manager based on that the first connection manager is deregistered.

According to an embodiment of the disclosure, a wireless communication performing method of an electronic device may include identifying the first number of available wireless connections of the electronic device, receiving the second number of available wireless connections of a first external electronic device of a plurality of external electronic devices by using a communication circuit, identifying the third number of wireless connections to be used for data transmission and reception with the first external electronic device, based on the first number thus identified and the second number thus received, establishing the third number of the wireless connections with the first external electronic device, and transmitting/receiving data with the first external electronic device by using the third number of the wireless connections.

According to an embodiment, the method may further include identifying information about a status of the electronic device, and identifying the first number of the available wireless connections of the electronic device based on the information thus identified.

According to an embodiment, the identifying of the third number of wireless connections to be used for data transmission and reception with the first external electronic device, based on the first number thus identified and the second number thus may include determining one having a small value from among the first number thus identified and the second number thus received, as the third number of the wireless connections to be used for the data transmission and reception with the first external electronic device.

According to an embodiment, the identifying of the third number of wireless connections to be used for data transmission and reception with the first external electronic device, based on the first number thus identified and the second number thus may include determining one having a great value from among the first number thus identified and the second number thus received, as the third number of the wireless connections to be used for the data transmission and reception with the first external electronic device.

According to an embodiment, the identifying of the third number of wireless connections to be used for data transmission and reception with the first external electronic device, based on the first number thus identified and the second number thus may include determining a device receiving the data from among the electronic device and the external electronic device, and determining the number of available wireless connections of the device thus identified as the third number of the wireless connections to be used for the data transmission and reception with the first external electronic device.

According to an embodiment, the method may further include identifying the number of available wireless connections of the electronic device except for the third number while transmitting/receiving the data with the first external electronic device by using the third number of the wireless connections, and continuing to transmit/receive the data by using a wireless connection of one of the third number and the number of the available wireless connections of the electronic device except for the third number thus identified.

According to an embodiment, the method may further include receiving the fourth number of available wireless connections of a second external electronic device of the plurality of external electronic devices by using the communication circuit, and identifying the fifth number of wireless connections to be used for data transmission and reception with the second external electronic device, based on the first number, the third number, and the fourth number According to an embodiment, the method may further include obtaining status information of the electronic device based on a specified period by using a status agent, transmitting the status information thus obtained to a resource manager, and identifying the first number of the available wireless connections of the electronic device based on the status information by using the resource manager.

According to an embodiment, when the third number of the wireless connections to be used for the data transmission and reception with the first external electronic device is identified, the method may further include creating a first connection manager, registering the first connection manager at the resource manager, and allocating the third number to the first connection manager. When the fifth number of the wireless connections to be used for the data transmission and reception with the second external electronic device is identified, the method may further include creating a second connection manager, registering the second connection manager at the resource manager, and allocating the fifth number to the second connection manager.

According to an embodiment, when the data transmission and reception with the first external electronic device is identified as being terminated, the method may further include deregistering the first connection manager from the resource manager, and allocating the sixth number to the second connection manager by using the resource manager based on that the first connection manager is deregistered.

What is claimed is:

1. An electronic device comprising:
   a communication circuit;
   a processor; and
   a memory which stores instructions,
   wherein the instructions, when executed by the processor, cause the electronic device to:
   identify a first number, which is a number of available wireless connections of the electronic device;
   receive a second number, which is a number of available wireless connections of a first external electronic device of a plurality of external electronic devices, by using the communication circuit;
   identify a third number, which is a number of wireless connections to be used for data transmission and reception with the first external electronic device, based on the first number and the second number;
   establish the third number of wireless connections with the first external electronic device;
   receive a fourth number, which is a number of available wireless connections of a second external electronic device of the plurality of external electronic devices, by using the communication circuit;
   identify a fifth number, which is a number of wireless connections to be used for data transmission and reception with the second external electronic device, based on the first number, the third number and the fourth number;
   establish the fifth number of wireless connections with the second external electronic device; and
   transmit/receive data with the first external electronic device by using the third number of the wireless connections and with the second external electronic device by using the fifth number of the wireless connections,
   wherein a sum of the third number and the fifth number is less than or equal to the first number.

2. The electronic device of claim 1, wherein the instructions, when executed by the processor, cause the electronic device to:
   identify status information of the electronic device; and
   identify the first number, which is the number of the available wireless connections of the electronic device, based on the status information of the electronic device.

3. The electronic device of claim 1, wherein the instructions, when executed by the processor, cause the electronic device to:
   determine one having a less value from among the first number and the second number, as the third number, which is the number of the wireless connections to be used for the data transmission and reception with the first external electronic device.

4. The electronic device of claim 1, wherein the instructions, when executed by the processor, cause the electronic device to:
   determine one having a greater value from among the first number and the second number, as the third number of the wireless connections to be used for the data transmission and reception with the first external electronic device.

5. The electronic device of claim 1, wherein the instructions, when executed by the processor, cause the electronic device to:
   determine a device receiving the data from among the electronic device and the first external electronic device; and
   determine a number of available wireless connections of the device receiving the data from among the electronic device and the first external electronic device as the third number of the wireless connections to be used for the data transmission and reception with the first external electronic device.

6. The electronic device of claim 1, wherein the instructions, when executed by the processor, cause the electronic device to:
   identify a number of remaining available wireless connections of the electronic device except for the third number of the wireless connections to be used for the data transmission and reception with the first external electronic device while transmitting/receiving the data with the first external electronic device by using the third number of the wireless connections; and
   continue to transmit/receive the data by using a wireless connection of one of the third number and the number of the remaining available wireless connections of the electronic device except for the third number of the wireless connections to be used for the data transmission and reception with the first external electronic device.

7. The electronic device of claim 1, further comprising:
   a resource manager and a status agent stored in the memory,
   wherein the instructions, when executed by the processor, cause the electronic device to:
   obtain status information of the electronic device based on a specified period by using the status agent;
   transmit the status information to the resource manager; and
   identify the first number of the available wireless connections of the electronic device based on the status information by using the resource manager.

8. The electronic device of claim 7, wherein the instructions, when executed by the processor, cause the electronic device to:
   when the third number, which is the number of the wireless connections to be used for the data transmission and reception with the first external electronic device, is identified, create a first connection manager, register the first connection manager at the resource manager, and allocate the third number to the first connection manager; and when the fifth number, which is the number of the wireless connections to be used for the data transmission and reception with the second external electronic device, is identified, create a second connection manager, register the second connection manager at the resource manager, and allocate the fifth number to the second connection manager.

9. The electronic device of claim 8, wherein the instructions, when executed by the processor, cause the electronic device to:
when the data transmission and reception with the first external electronic device is identified as being terminated, deregister the first connection manager from the resource manager; and
allocate a sixth number to the second connection manager by using the resource manager based on that the first connection manager is deregistered.

10. A wireless communication performing method of an electronic device, the method comprising:
identifying a first number, which is a number of available wireless connections of the electronic device;
receiving a second number, which is a number of available wireless connections of a first external electronic device of a plurality of external electronic devices by using a communication circuit;
identifying a third number, which is a number of wireless connections to be used for data transmission and reception with the first external electronic device, based on the first number and the second number;
establishing the third number of wireless connections with the first external electronic device;
receiving a fourth number, which is a number of available wireless connections of a second external electronic device of the plurality of external electronic devices, by using the communication circuit;
identifying a fifth number, which is a number of wireless connections to be used for data transmission and reception with the second external electronic device, based on the first number, the third number and the fourth number;
establishing the fifth number of wireless connections with the second external electronic device; and
transmitting/receiving data with the first external electronic device by using the third number of the wireless connections and with the second external electronic device by using the fifth number of the wireless connections,
wherein a sum of the third number and the fifth number is less than or equal to the first number.

11. The method of claim 10, further comprising:
identifying status information of the electronic device; and
identifying the first number, which is the number of the available wireless connections of the electronic device, based on the status information of the electronic device.

12. The method of claim 10, wherein the identifying the third number, which is the number of the wireless connections to be used for data transmission and reception with the first external electronic device, based on the first number and the second number includes:
determining one having a less value from among the first number and the second number, as the third number, which is the number of the wireless connections to be used for the data transmission and reception with the first external electronic device.

13. The method of claim 10, wherein the identifying the third number, which is the number of the wireless connections to be used for data transmission and reception with the first external electronic device, based on the first number and the second number includes:
determining one having a greater value from among the first number and the second number, as the third number, which is the number of the wireless connections to be used for the data transmission and reception with the first external electronic device.

14. The method of claim 10, wherein the identifying the third number, which is the number of wireless connections to be used for data transmission and reception with the first external electronic device, based on the first number and the second number includes:
determining a device receiving the data from among the electronic device and the external electronic device; and
determining a number of available wireless connections of the device receiving the data from among the electronic device and the external electronic device as the third number, which is the number of the wireless connections to be used for the data transmission and reception with the first external electronic device.

15. The method of claim 10, further comprising:
identifying a number of remaining available wireless connections of the electronic device except for the third number of the wireless connections to be used for the data transmission and reception with the first external electronic device while transmitting/receiving the data with the first external electronic device by using the third number of the wireless connections; and
continuing to transmit/receive the data by using a wireless connection of one of the third number and the number of the remaining available wireless connections of the electronic device except for the third number of the wireless connections to be used for the data transmission and reception with the first external electronic device.

16. The method of claim 10, further comprising:
obtaining status information of the electronic device based on a specified period by using a status agent;
transmitting the status information of the electronic device to a resource manager; and
identifying the first number, which is the number of the available wireless connections of the electronic device, based on the status information by using the resource manager.

17. The method of claim 16, further comprising:
when the third number, which is the number of the wireless connections to be used for the data transmission and reception with the first external electronic device, is identified, creating a first connection manager, registering the first connection manager at the resource manager, and allocating the third number to the first connection manager; and
when the fifth number, which is the number of the wireless connections to be used for the data transmission and reception with the second external electronic device, is identified, creating a second connection manager, registering the second connection manager at the resource manager, and allocating the fifth number to the second connection manager.

18. The method of claim 17, further comprising:
when the data transmission and reception with the first external electronic device is identified as being terminated, deregistering the first connection manager from the resource manager; and allocating a sixth number to the second connection manager by using the resource manager based on that the first connection manager is deregistered.

\* \* \* \* \*